US012431566B2

United States Patent
Ootsuka et al.

(10) Patent No.: US 12,431,566 B2
(45) Date of Patent: Sep. 30, 2025

(54) HERMETICALLY SEALED BATTERY

(71) Applicant: PANASONIC INTELLECTUAL PROPERTY MANAGEMENT CO., LTD., Osaka (JP)

(72) Inventors: Masao Ootsuka, Osaka (JP); Tadayoshi Takahashi, Osaka (JP); Futoshi Tanigawa, Osaka (JP); Naoaki Nishimura, Osaka (JP); Kyosuke Okazaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 519 days.

(21) Appl. No.: 17/924,002

(22) PCT Filed: Apr. 20, 2021

(86) PCT No.: PCT/JP2021/015960
§ 371 (c)(1),
(2) Date: Nov. 8, 2022

(87) PCT Pub. No.: WO2021/230014
PCT Pub. Date: Nov. 18, 2021

(65) Prior Publication Data
US 2023/0178831 A1 Jun. 8, 2023

(30) Foreign Application Priority Data
May 15, 2020 (JP) .................................. 2020-086230

(51) Int. Cl.
*H01M 50/184* (2021.01)
*H01M 50/107* (2021.01)
(Continued)

(52) U.S. Cl.
CPC ....... *H01M 50/184* (2021.01); *H01M 50/107* (2021.01); *H01M 50/188* (2021.01); *H01M 50/559* (2021.01)

(58) Field of Classification Search
CPC ............. H01M 50/186; H01M 50/184; H01M 50/188; H01M 50/593
See application file for complete search history.

(56) References Cited

U.S. PATENT DOCUMENTS

2006/0051665 A1\* 3/2006 Rigobert ............. H01M 50/176
29/623.2
2013/0004832 A1\* 1/2013 Kim .................... H01M 50/176
429/179

FOREIGN PATENT DOCUMENTS

JP H11-031487 A 2/1999
JP H11-167909 A 6/1999
(Continued)

OTHER PUBLICATIONS

International Search Report dated Jul. 13, 2021, issued in counterpart International Application No. PCT/JP2021/015960.

*Primary Examiner* — Brian R Ohara
*Assistant Examiner* — Brent C Thomas
(74) *Attorney, Agent, or Firm* — WHDA, LLP

(57) ABSTRACT

A hermetically sealed battery includes a battery can having a bottomed cylindrical shape and an opening, an electrode body accommodated in the battery can, a sealing plate covering the opening of the battery can, a rivet disposed on the sealing plate and serving as a terminal, an insulator insulates the sealing plate from the rivet, and an internal lead electrically connected to the rivet. The insulator includes a sealing part sealing between the sealing plate and the rivet and a plate part closer to the electrode body than the sealing part, the plate part being extended in a radial direction of the electrode body. The plate part has a cut-away portion
(Continued)

recessed in a periphery of the plate part in the radial direction. The internal lead is partially disposed in the cut-away portion.

4 Claims, 4 Drawing Sheets

(51) Int. Cl.
  *H01M 50/188* (2021.01)
  *H01M 50/559* (2021.01)

(56) References Cited

FOREIGN PATENT DOCUMENTS

| | | |
|---|---|---|
| JP | 2001-185118 A | 7/2001 |
| JP | 2010-009841 A | 1/2010 |
| WO | 2019/194053 A1 | 10/2019 |

* cited by examiner

HERMETICALLY SEALED BATTERY

CROSS REFERENCE TO RELATED APPLICATIONS

This Application is the National Stage of International Application No. PCT/JP2021/015960, filed on Apr. 20, 2021, which claims priority from Application No. 2020-086230 filed on May 15, 2020 in Japan. The entire contents of these applications are incorporated herein by reference in their entirety.

TECHNICAL FIELD

The present disclosure relates to a hermetically sealed battery including a battery can, an electrode body accommodated in the battery can, and a sealing plate covering an opening of the battery can.

BACKGROUND ART

As a method of sealing a hermetically sealed battery, PTL 1 discloses a structure that includes a battery case, a sealing plate covering an opening of the battery case, a rivet disposed on the sealing plate and serving as a terminal, and a gasket insulating the sealing plate from the rivet. On a lower side of the sealing plate (side facing an electrode plate group), the gasket is bent in a direction of an electrode plate group to surround a metal washer electrically connected to a current collecting lead of the electrode plate group. This structure suppresses movement of the electrode plate group to prevent upward displacement of the electrode plate typically due to a drop impact.

CITATION LIST

Patent Literature

PTL 1: Japanese Patent Laid-Open Publication No. 11-167909

SUMMARY OF THE INVENTION

However, an actual drop direction is not limited to a direction from the electrode plate group toward the sealing plate (a Z-direction), and a drop impact may be applied in a direction (XY direction) perpendicular to the direction from the electrode plate group toward the sealing plate. In PTL 1, when an impact is applied in the XY direction, a connecting part with the current collecting lead moves according to movement of the electrode plate group. In this case, when the current collecting lead is not sufficiently extended, a tension occurs in the current collecting lead. As a result, the washer may be partially or completely disconnected from the current collecting lead, thus causing an electrical connection failure.

A hermetically sealed battery in accordance with one aspect of the present disclosure includes a battery can having a bottomed cylindrical shape and an opening, an electrode body accommodated in the battery can, a sealing plate covering the opening of the battery can, a rivet disposed on the sealing plate and serving as a terminal, an insulator insulates the sealing plate from the rivet, and an internal lead electrically connected to the rivet. The insulator includes a sealing part sealing between the sealing plate and the rivet and a plate part closer to the electrode body than the sealing part, the plate part being extended in a radial direction of the electrode body. The plate part has a cut-away portion recessed in a periphery of the plate part in the radial direction. The internal lead is partially disposed in the cut-away portion.

The present disclosure offers a hermetically sealed battery with preferable impact resistance to retain electrical connection between the electrode body and the terminal even when an impact typically caused by dropping is applied.

DESCRIPTION OF EMBODIMENT

Figure 1:
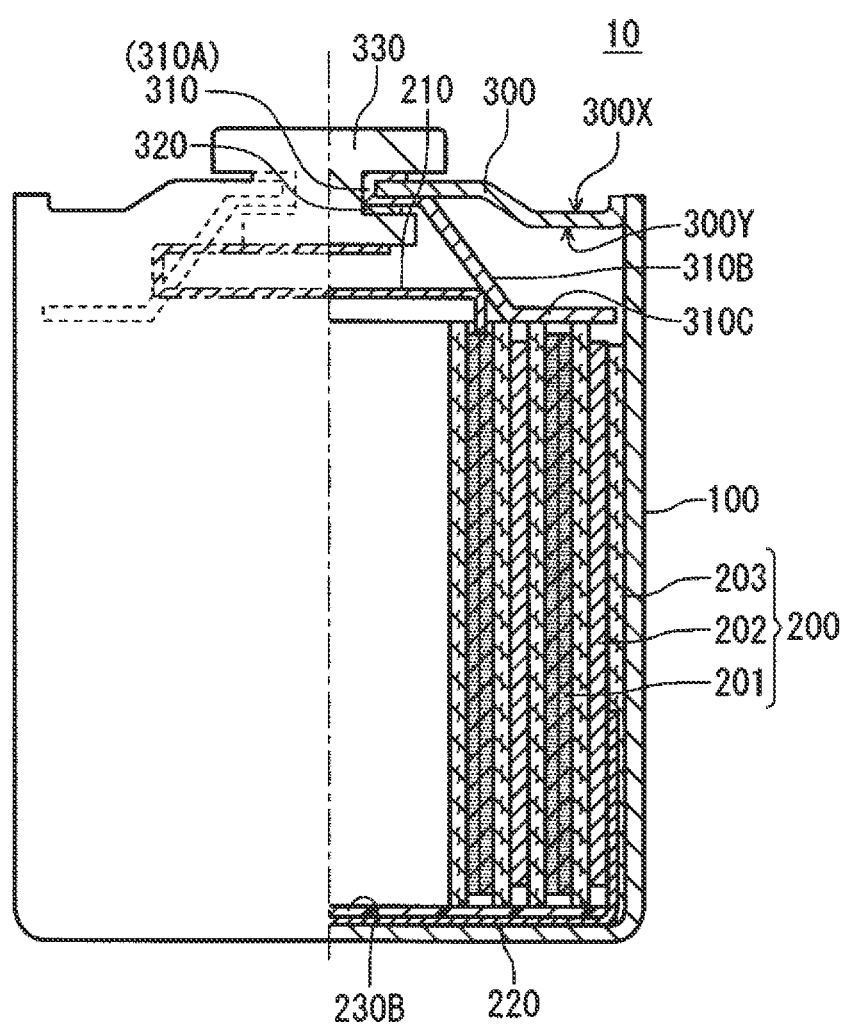
FIG. 1 is a schematic sectional view of a hermetically sealed battery in accordance with an exemplary embodiment of the present disclosure.

A hermetically sealed battery (hereinafter also simply referred to as a battery) includes a battery can that has a bottomed cylindrical shape and an opening, an electrode body accommodated in the battery can, a sealing plate covering the opening of the battery can, a rivet disposed on the sealing plate and serving as a terminal, an insulator insulating the sealing plate from the rivet, and an internal lead electrically connected to the rivet. The insulator is, for example, a gasket. The insulator may be made of resin material.

In the following description, a direction of the battery from the electrode body toward the terminal (rivet) is defined as a Z-direction. The Z-direction is referred to as a vertical direction, an axial direction, or a height direction of the battery. A direction perpendicular to the direction (Z-direction) from the electrode body toward the terminal (rivet) is referred to as XY directions. The XY direction includes a radial direction.

The insulator includes a sealing part sealing between the sealing plate and the rivet and a plate part disposed closer to the electrode body than the sealing part and extended in the radial direction of the electrode body. The plate part restricts movement of the electrode body in the Z-direction. The plate part is extended in the Z-direction to the vicinity of the electrode body. The plate part preferably protrudes in the Z-direction and contacts an insulating plate disposed above the electrode body or directly contacts the electrode body. As a result, the position of the electrode body along the Z-direction is fixed to enhance impact resistance even when a drop impact and the like is applied. In addition, an increase of internal resistance due to winding deviation of the electrode body is suppressed, thus providing a reliable battery.

The plate part has a cut-away portion recessed in a periphery in the radial direction. The internal lead is partially disposed in the cut-away portion so that the internal lead is extended in the cut-away portion. This configuration restricts movement (or rotation) of the internal lead in the XY directions, and restricts movement (or rotation) of the electrode body connected to the internal lead in the XY directions. Accordingly, the position of the electrode body is fixed in an arbitrary three-dimensional direction, and thus the impact resistance is further enhanced when a drop impact and the like is applied. Furthermore, the increase of internal resistance due to disconnection of the internal lead is suppressed, thus providing a reliable battery.

The internal lead partially disposed in the cut-away portion restricts a movement (rotation) of the internal lead and the electrode body in the XY directions, hence enhancing the impact resistance. This is particularly effective in that in case of using an electrode body with a small diameter, as a space between the electrode body and the battery can is large, the electrode body easily allow to move in the XY directions due to a drop impact and the like.

The cut-away portion is formed by, for example, notching a portion of the periphery of the plate part (FIG. 2(A)). For example, the internal lead may pass through a clearance in the plate part created by the cut-away portion and folded to be accommodated between the electrode body and the terminal. Accordingly, the internal lead is locked with the cut-away portion of the plate part. This configuration restricts a movement of the internal lead according to the movement of the electrode body.

One cut-away portion or plural cut-away portions may be provided in the periphery of the plate part. The plural cut-away portions in the periphery of the plate part easily restricts the movement of the electrode body.

The plate part may include a sloped portion in which a point on the sloped portion approaches the electrode body as shifting outward in the radial direction. In this case, the sloped portion serves as a spring capable of reducing an impact. In addition, since a portion of the sloped portion contacting the insulating plate (or electrode body) approaches outside in the radial direction, an area of the contacting portion increases to securely fix the electrode body against the drop impact and the like. As a result, impact resistance is enhanced and thus reliability is improved.

Tilt angle θ of the sloped portion in an extending direction with respect to the axial direction of the battery may range, for example, from 20° to 70°.

The plate part may preferably further include a flange portion bent from the sloped portion and extended outward in the radial direction along an end surface of the electrode body. The flange portion is extended, for example, on a surface of the insulating plate or a flat surface along the end surface of the electrode body to form a flat portion. In this case, a surface of the flange portion contacts a surface of the insulating plate (or electrode body) at a large aera. Accordingly, the electrode body may be reliably fixed against the drop impact and the like to enhance the impact resistance, thus providing a reliable battery.

The insulating plate is often provided above the electrode body to insulate the electrode body from the battery can and the terminal to prevent internal short-circuiting. However, the plate part including the flange portion may not require the insulating plate separately since the flange portion may serve as the insulating plate.

The flange portion may press the electrode body in the Z-direction. This configuration fixes the position of the electrode body in the Z-direction. Furthermore, a friction force caused by pressing also suppresses displacement of the electrode body in the XY directions, thus fixing the position thereof in the XY directions. Accordingly, an effect of fixing the position of the electrode body in the arbitrary three-dimensional direction is increased to enhance the impact resistance against the drop impact and the like. As a result, the increase of internal resistance due to winding deviation of the electrode body or disconnection of the internal lead can be suppressed, thus providing a reliable battery.

In consideration of an expansion of the electrode body in actual use, the flange portion may protrude outward in the radial direction from the electrode body of the battery immediately after manufacturing. In this case, a space exists between the battery can and the electrode body, and thus the electrode body may be easily moved in the XY direction. However, the cut-away portion and the flange portion suppress the movement of the electrode body in the XY directions against the drop impact and the like.

In the case that the insulating plate is provided, width W of the flange portion in the radial direction may range, for example, from 0.05 times to 0.5 times of the maximum diameter of the electrode body. When width W is 0.05 times or more of the maximum diameter of the electrode body, a displacement of the electrode body can be easily suppressed in the arbitrary three-dimensional direction via the insulating plate. From a view of enhancing a suppression effect of displacement while reducing a volume occupied by the flange portion inside the battery, width W may range preferably from 0.1 times to 0.4 times of the maximum diameter of the electrode body, and more preferably from 0.2 times to 0.3 times. In the case that the maximum diameter of the electrode body is 16 mm, width W may range, for example, from 0.8 mm to 8.0 mm.

On the other hand, in the case that the insulating plate is not provided, a sufficiently large contact area between the flange portion and the electrode body is preferably secured in order to suppress the displacement of the electrode body in the arbitrary three-dimensional direction. In this case, width W of the flange portion in the radial direction may range from 0.1 times to 0.7 times of the maximum diameter of the electrode body. From a view of enhancing the suppression effect of positional deviation while reducing the volume occupied by the flange portion inside the battery, width W ranges preferably from 0.2 times to 0.6 times of the maximum diameter of the electrode body, and more preferably from 0.3 times to 0.5 times. In the case that the maximum diameter of the electrode body is 16 mm, width W may range, for example, from 1.6 mm to 11.2 mm.

Similarly to width W, outer diameter D of the flange portion also depends on a presence of the insulating plate. In the case that the insulating plate is provided, outer diameter D of the flange portion may range, for example, from 0.5 times to 1.1 times of the maximum diameter of the electrode body. In the case that the insulating plate is not provided, outer diameter D may range from 0.7 times to 1.5 times.

The flange portion may have a through-hole provided therein. The through-hole suppresses warping of the insulator due to aging of the insulator.

The insulator expands or shrinks due to aging, and may warp. In particular, when the flange portion of the insulator warps, the flange portion is no longer flat and the contact area with the electrode body (or insulating plate) decreases. As a result, the effect of fixing the electrode body against the drop impact and the like may decrease. However, the through-hole expands or shrinks to suppress warping. Accordingly, a high effect of fixing the electrode body in a long duration of use can be maintained to enhance the impact resistance and improve the reliability.

The opening of the through-hole created in the flange portion preferably has a circular shape. In this case, a diameter of the through-hole may range, for example, from 0.6 mm to 3 mm in the case that the maximum diameter of the electrode body is 16 mm. The diameter of the through-hole may range, for example, from 0.3 times to 0.7 times of width W of a second portion. The through-hole may be created at each of one or more positions along a circumferential direction of the flange portion.

The hermetically sealed battery in accordance with an exemplary embodiment will be described below with reference to the drawings. However, the exemplary embodiment is not limited thereto. In the drawings, same reference marks are given to components having the same functions.

FIG. 1 is a longitudinal sectional view of the hermetically sealed battery.

Battery 10 includes battery can 100 having a bottomed cylindrical shape, electrode body 200 having a cylindrical shape and accommodated in battery can 100, and sealing plate 300 covering an opening of battery can 100. Sealing plate 300 is fixed to battery can 100 in the vicinity of the opening of battery can 100 typically by laser welding. Sealing plate 300 may be crimped in the vicinity of the opening of battery can 100.

A material of battery can 100 and sealing plate 300 is not particularly limited, and iron and/or iron alloy (including stainless steel), aluminum, aluminum alloy (alloy containing a slight amount of other metal such as manganese or copper) can be exemplified as the material.

Sealing plate 300 is fixed to battery can 100 in the vicinity of the opening of battery can 100 to cover the opening. Sealing plate 300 has first main surface 300X facing outside the battery can and second main surface 300Y opposite to first main surface 300X, and has an annular shape with a through-hole provided therein at its center. External terminal 330 (rivet) with a crushed tip portion thereof is fixed in the through-hole at the center of sealing plate 300 via insulating gasket 310 (insulator) and washer 320. External terminal 330 is connected to an end of internal lead 210 led out from a positive electrode or a negative electrode configuring the electrode body. Hereinafter, a component configured with sealing plate 300, gasket 310, washer 320, and external terminal 330 may be referred to as a sealing body. However, shapes of sealing plate 300 and the sealing body are not limited thereto.

While not illustrated, a thin portion is provided in sealing plate 300 or the bottom of battery can 100 between an outer periphery and an inner periphery. When an internal pressure of the battery increases, a pressure is applied in a direction that sealing plate 300 or battery can 100 swells outward. At this point, a tensile stress is intensively applied to the thin portion. When the sealing plate or the battery breaks at the thin portion, an explosion-proof function activates to release the internal pressure.

Gasket 310 is, for example, made of a resin material, and is formed by insert molding or injection molding together with sealing plate 300. Gasket 310 includes sealing part 310A that seals between sealing plate 300 and external terminal 330, and the plate part that is closer to electrode body 200 than sealing part 310A and extended in the radial direction. The plate part includes sloped portion 310B extended outward along the radial direction from sealing part 310A toward electrode body 200, and flange portion 310C that is bent and extended outward along the radial direction from sloped portion 310B along the end surface of electrode body 200.

Sloped portion 310B restricts the movement of the electrode body in the Z-direction. This configuration enhances the impact resistance and suppresses an increase of internal resistance due to winding deviation of the electrode body even when the drop impact and the like is applied, thus providing a reliable battery.

In battery 10 illustrated in FIG. 1, flange portion 310C directly contacts electrode body 200. Flange portion 310C has at least a flat surface facing the electrode body, and the flat surface is extended outward along the radial direction along an outer surface (end surface) of electrode body 200 to surface-contact the outer surface of the electrode body. Flange portion 301C preferably presses electrode body 200. This configuration enhances the effect of fixing the position of the electrode body in the arbitrary three-dimensional direction, and the impact resistance against the drop impact and the like can be improved. As a result, the increase of the internal resistance due to winding deviation of the electrode body or disconnection of internal wiring can be further suppressed to achieve the highly-reliable battery.

Flange portion 310C may contact the insulating plate (upper insulating plate) provided on electrode body 200. In this case, flange portion 310C presses electrode body 200 via the upper insulating plate. Accordingly, the position of the electrode body can be fixed in the arbitrary three-dimensional direction to improve the impact resistance against the drop impact and the like. As a result, the increase of the internal resistance due to winding deviation of the electrode body or disconnection of internal wiring can be further suppressed to achieve the highly-reliable battery.

Figure 2:
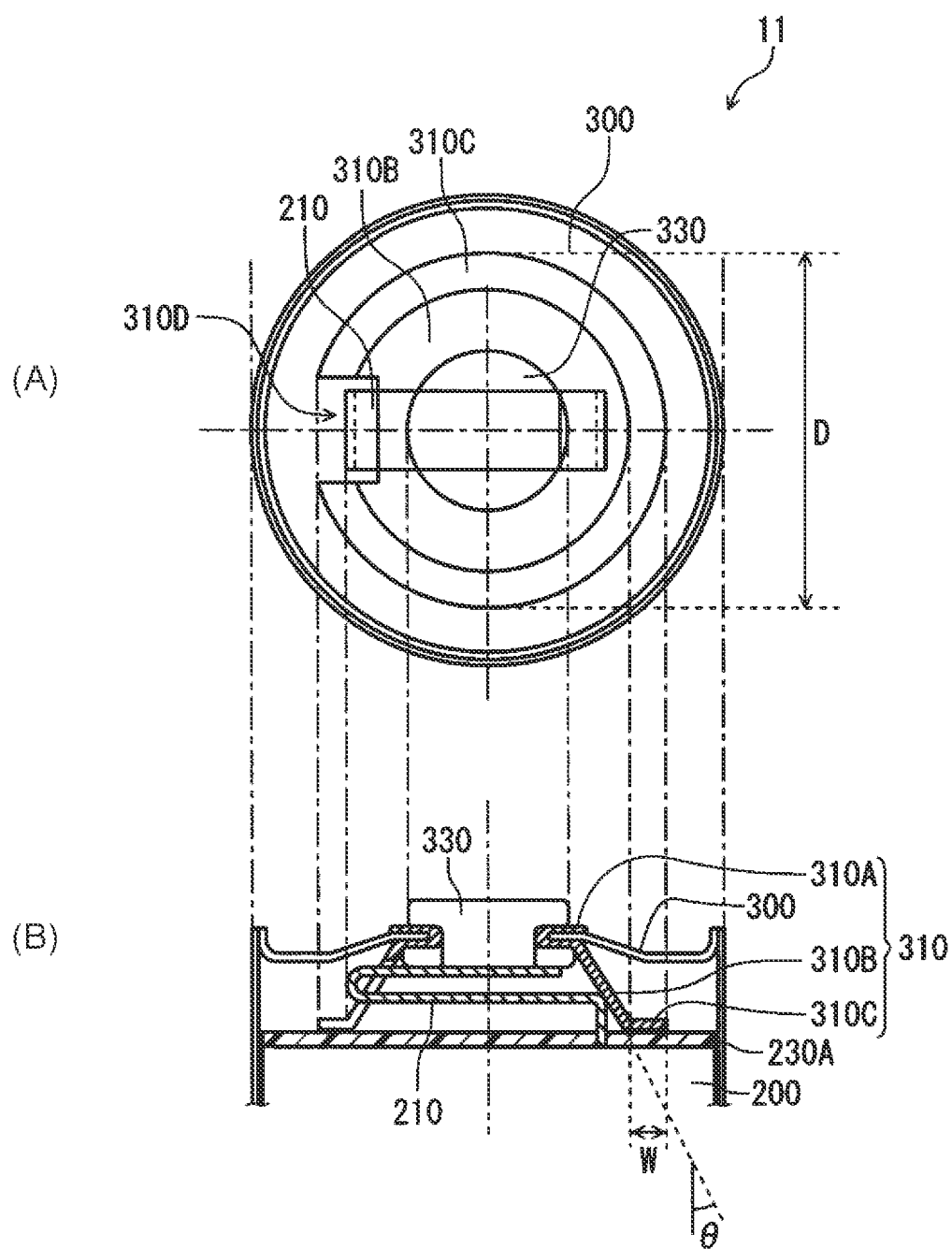
FIG. 2 is top view (A) and sectional view (B) of an essential part of a hermetically sealed battery in accordance with another exemplary embodiment of the present disclosure.

FIG. 2 is a schematic view of an essential part of battery 11 including upper insulating plate 230A. FIG. 2(A) is a top view of the sealing body of battery 11 viewed from electrode body 200. FIG. 2(B) is an enlarged schematic sectional view of a part of the battery in the vicinity of the sealing body.

As illustrated in FIG. 2, gasket 310 is extended while inclining such that a point on the gasket approaches electrode body 200 as the point shifts outward along the radial direction from sealing part 310A toward electrode body 200. A portion of the gasket extended inclining constitutes sloped portion 310B. Gasket 310 is further bend from sloped portion 310B and extended outward in the radial direction along a surface of upper insulating plate 230A on a gasket side. This portion extending outward in the radial direction along the outer surface (end surface) of the electrode body constitutes flange portion 310C.

A periphery of gasket 310 is partially notched in sloped portion 310B and flange portion 310C to form cut-away portion 310D. Internal lead 210 is extended in a clearance created by cut-away portion 310D in sloped portion 310B and flange portion 310C and is folded to be accommodated between electrode body 200 and external terminal 330. Since internal lead 210 is extended to cut-away portion 310D, the displacement of internal lead 210 in the XY directions is restricted. Accordingly, the impact resistance is enhanced to suppress the increase of internal pressure due to disconnection of the internal lead. As a result, the highly-reliable battery can be achieved.

Since internal lead 210 is extended to cut-away portion 310D, long internal lead 210 can be accommodated. When the drop impact and the like is applied, a force applied to a connected portion of external terminal 330 and internal lead 210 with respect to the movement of electrode body 200 is reduced more in a longer lead wire and thus the impact resistance is enhanced.

Plural cut-away portions 310D may be provided in the circumferential direction. Plural cut-away portions 310D provided in the circumferential direction easily restricts the movement of the electrode body in the XY directions.

Figure 3:
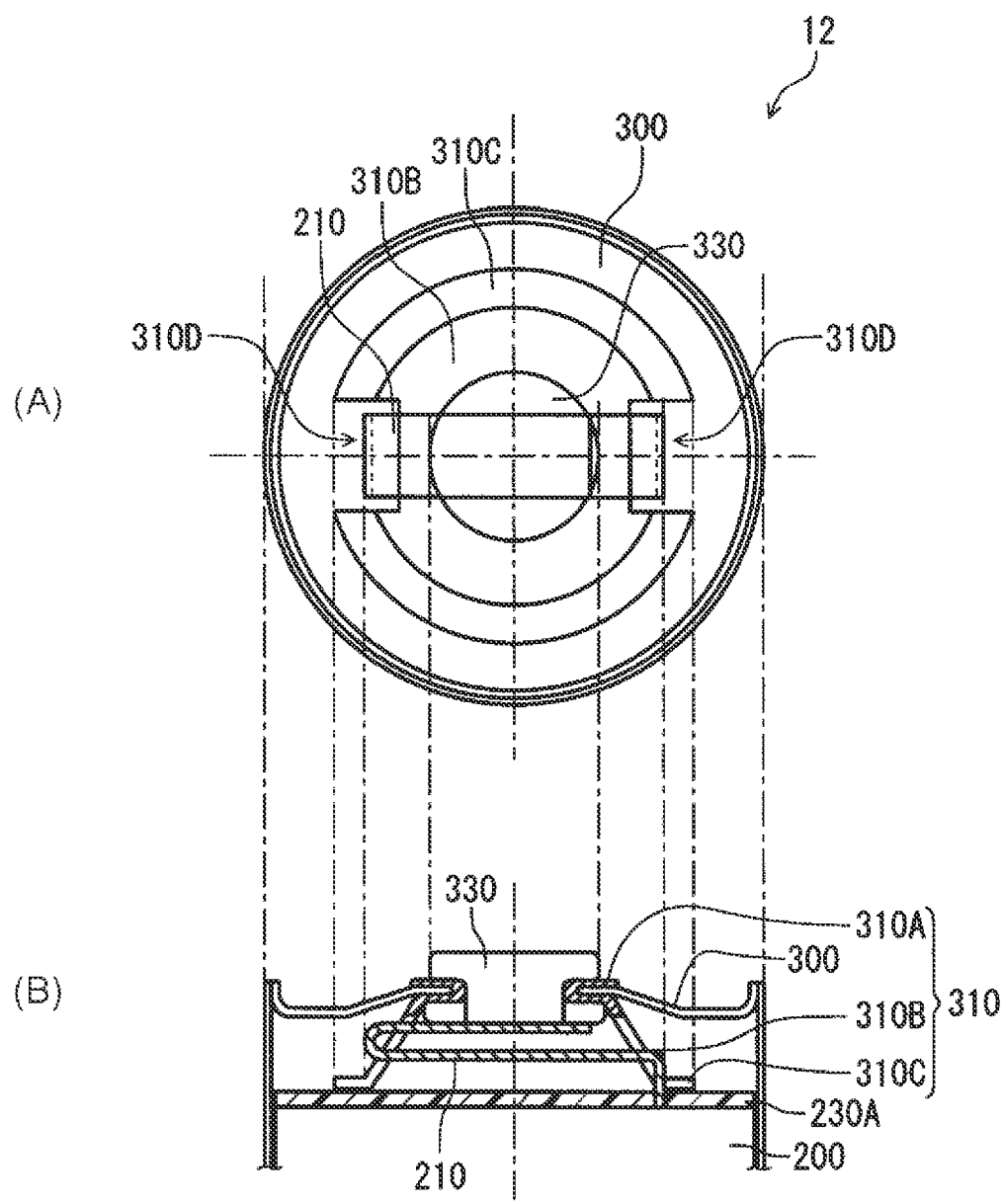
FIG. 3 is top view (A) and sectional view (B) of an essential part of a hermetically sealed battery in accordance with still another exemplary embodiment of the present disclosure.
Figure 4:
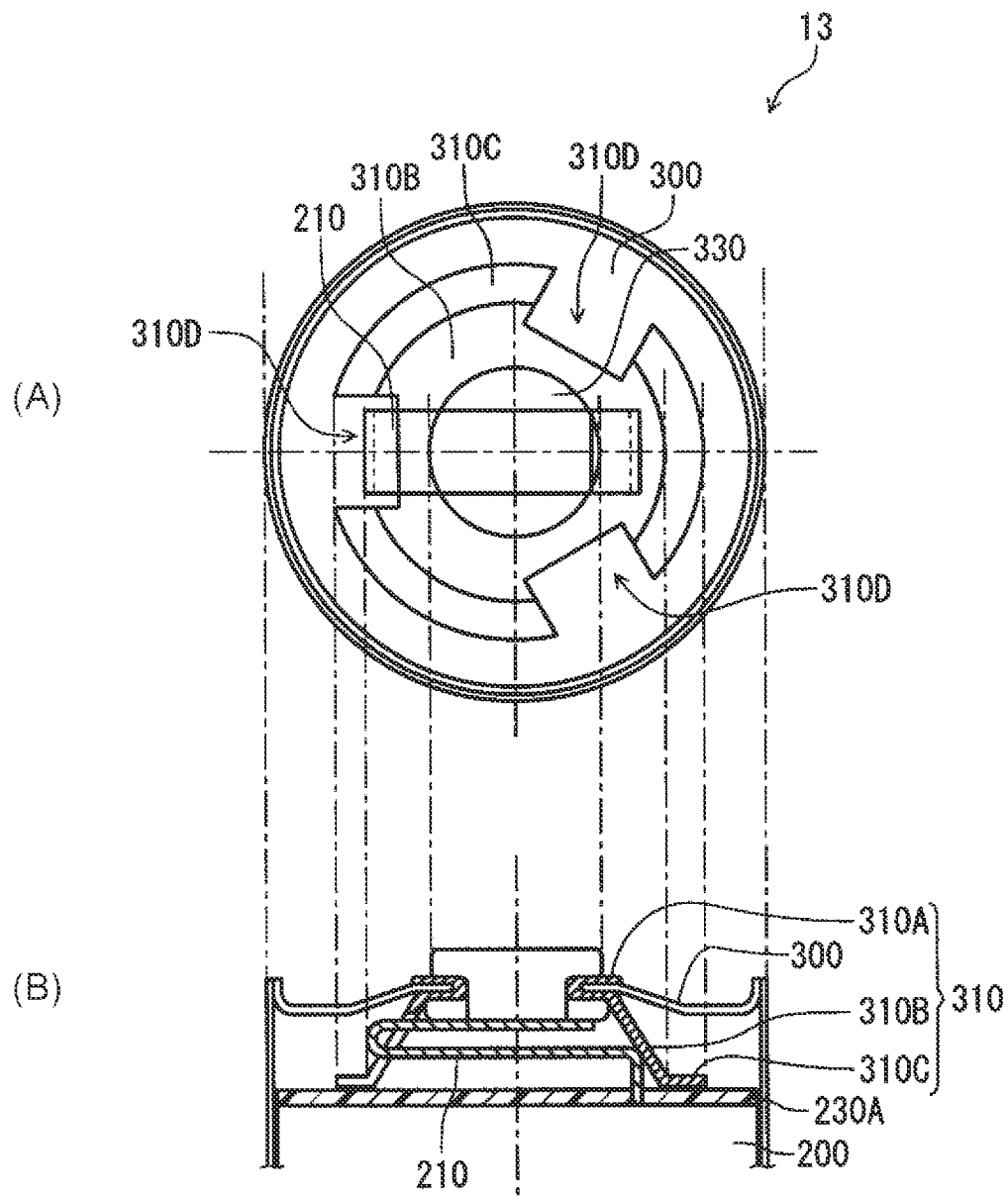
FIG. 4 is top view (A) and sectional view (B) of an essential part of a hermetically sealed battery in accordance with a further exemplary embodiment of the present disclosure.

FIG. 3 illustrates an example of battery 12 having two cut-away portions 310D. FIG. 4 illustrates an example of battery 13 having three cut-away portions 310D. In FIG. 3 and FIG. 4, similar to FIG. 2, FIGS. 3(A) and 4(A) are top views of the sealing body of the battery viewed from of electrode body 200, and FIGS. 3(B) and 4(B) are enlarged schematic sectional views of the sealing body magnifying the vicinity of the sealing body.

In battery 12 illustrated in FIG. 3, two cut-away portions 310D are provided at positions opposite to each other (positions where angles are 0° and 180° in the circumferential direction). Internal lead 210 is extended from the connecting portion with electrode body 200 to one cut-away portion, and is then bent to be extended to the other cut-away portion so that internal lead 20 is accommodated between electrode body 200 and external terminal 330. Accordingly, the movement of internal lead 210 in the XY directions can be further suppressed to further enhance the impact resistance.

FIGS. 2 to 4 illustrate an essential part of the battery including upper insulating plate 230A. However, in battery 10 without upper insulating plate 230A illustrated in FIG. 1 can also adopt a structure of cut-away portion 310D similar to FIGS. 2 to 4.

A material of gasket 310 is not limited but, for example, polypropylene (PP), polyphenylene sulfide (PPS), polyetheretherketone (PEEK), polyethylene (PE), polybutylene terephthalate (PBT), perfluoroalkoxy alkane (PFA), polytetrafluoroethylene (PTFE), and polyamide (PA) can be used.

Next, the structure of the electrode body will be described taking a lithium primary battery as an example.

Electrode body 200 having the cylindrical shape is a winding type, and formed by spirally winding positive electrode 201 and negative electrode 202 via separator 203 in between. One of positive electrode 201 and negative electrode 202 (positive electrode 201 in an illustrated example) is connected to internal lead 210. Internal lead 210 is connected to external terminal 330 typically by welding. The other of positive electrode 201 and negative electrode 202 (negative electrode 202 in the illustrated example) is connected to different internal lead 220. Internal lead 220 is connected to an inner surface of battery can 100 typically by welding.

Electrode body 200 is accommodated in battery can 100 together with electrolyte (not illustrated). Normally, to prevent internal short-circuiting, the upper insulating plate and the lower insulating plate are disposed on an upper part and a lower part of electrode body 200, respectively. However, in the battery according to the exemplary embodiment, flange portion 310C of the gasket serves as the upper insulating plate. As illustrated in FIG. 1, the battery may include only lower insulating plate 230B or both upper insulating plate 230A and lower insulating plate 230B as exemplified in FIG. 2.

Positive Electrode

The positive electrode includes a positive electrode active material. Manganese dioxide may be used as the positive electrode active material. The positive electrode includes, for example, a positive electrode collector and a positive electrode mixture layer attached to the positive electrode collector. The positive electrode mixture layer may contain resin material, such as fluorine resin, as binder in addition to the positive electrode active material. The positive electrode mixture layer may further contain conductive material, such as a carbon material, as conductive agent. The positive electrode collector is, for example, an expanded metal, a net, or a punching metal made of stainless steel.

Negative Electrode

The negative electrode includes a negative electrode active material. Metallic lithium or lithium alloy may be used as the negative electrode active material. For example, extrusion molding is performed on the metallic lithium or lithium alloy to form a long sheet to be used as the negative electrode. The lithium alloy is, for example, alloy of LI-AL, Li—Sn, Li—Ni—Si, or Li—Pb, but Li—Al alloy is preferable. Content of metal element other than lithium in the lithium alloy may range preferably from 0.1% by mass to 5% by mass.

Separator

The separator is preferably a fine porous membrane or nonwoven fabric made of resin. A material (resin) of the separator is preferably polyolefin, polyamide, polyamideimide, and the like.

Electrolyte

The electrolyte is nonaqueous solvent in which lithium salt is dissolved. The nonaqueous solvent is not particularly limited, but propylene carbonate, ethylene carbonate, 1,2-dimethoxyethane, or γ-butyrolactone can be used. As the lithium salt, lithium borofluoride, lithium hexafluorophosphate, lithium trifluoromethanesulfonate, lithium bis(fluorosulfonyl) imide, lithium bis (trifluoromethylsulfonyl) imide, and the like may be used.

The present disclosure will be detailed below with reference to examples and a comparative example. However, the present disclosure is not limited to the following examples.

Example 1

(1) Preparation of Sealing Body

A through-hole with a diameter of about 3 mm was formed in the center of the sealing plate with a diameter of 17 mm. In this through-hole, the rivet to serve as the external terminal was fixed via the insulating gasket and the washer to prepare the sealing body. The gasket prepared includes sloped portion 310B extended from the sealing part sealing between the external terminal and the sealing plate and flange portion 310C. Angle θ of 30° was formed between the extending direction of the sloped portion and a normal direction of the sealing plate. An extending length of the sloped portion was a length such that the flange portion contacts the electrode body when the sealing body is overlaid on the opening of the battery can. Width W of the flange portion in the radial direction was 3 mm, and outer diameter D of the flange portion was 14 mm. In the circumferential direction, one notch (cut-away portion) was formed in the sloped portion and the flange portion.

(2) Preparation of Positive Electrode

Ketjen black of 3.5 parts by mass, which is the conductive agent, polytetrafluoroethylene of 4.5 parts by mass, which is the binder, and pure water of appropriate amount were added to electrolytic manganese dioxide of 92 parts by mass, which is the positive electrode active material, and kneaded to prepare a wet positive electrode mix.

Next, the wet positive electrode mix was applied to the positive electrode collector made of stainless steel expanded metal to prepare a positive electrode precursor. Then, the positive electrode precursor was dried, rolled by roll press, and cut into predetermined dimensions to complete a positive electrode strip.

(3) Preparation of Negative Electrode

A Li—Al alloy sheet (Al content: 0.3% by mass) was cut into predetermined dimensions to complete a negative electrode strip.

(4) Preparation of Electrode Body

The positive electrode mixture was partially peeled from a portion of the positive electrode to expose the positive electrode collector. A positive electrode tab lead made of stainless steel was welded to the exposed portion of the positive electrode. A negative electrode tab lead made of nickel was press attached to a predetermined portion of the negative electrode. The positive electrode, the negative electrode, and the separator interposed between the electrodes were spirally wound to configure the electrode body with a cylindrical shape (diameter: 16 mm). The polyethylene fine porous membrane was used as the separator.

(5) Preparation of Electrolyte

Ethylene carbonate (EC), and 1, 2-dimetoxyethane (DME) mixed at a volume ratio of 2:1:2, lithium trifluoromethanesulfonate, as the lithium salt, was dissolved in a nonaqueous solvent of propylene carbonate (PC) at a concentration of 0.5 mol/liter to prepare the electrolyte.

(6) Assembly of Battery with Cylindrical Shape

While a lower insulating plate with a ring shape was disposed on a bottom of the electrode body, the electrode body was inserted into a bottomed cylindrical battery can (made of SUS316L). The negative electrode tab lead was welded onto an inner bottom of the battery can, and the positive electrode tab lead was welded onto the external terminal fixed on the sealing plate. Next, the electrolyte filled inside the battery can, and the sealing body was placed on the opening of the battery can such that the positive electrode tab lead is folded while that the positive electrode tab lead was partially arranged in the cut-away portion of the gasket. Then, the sealing plate was laser-welded onto the battery can in the vicinity of the opening of the battery can.

Twenty hermetically sealed cylindrical lithium batteries having the structure illustrated in FIG. 1 were thus prepared.

Evaluation

A drop test in accordance with IEC 60086-4 and JIS C 60068-2-31 was performed on ten lithium batteries out of the twenty lithium batteries immediately after preparation. Before and after the drop test, an internal resistance was measured to obtain internal resistance increase rate X1 due to the drop test.

(Internal resistance increase rate X1)=(Internal resistance after drop test)/(Internal resistance before drop test)−1 Remaining ten lithium batteries out of the twenty lithium batteries were left at −40° C. for 20 minutes and then at 85° C. for 20 minutes on the assumption of aging. Considering these temperatures as one cycle, a −40° C. and 85° C. cycle was repeated 1,000 times.

The same drop test as the batteries immediately after preparation was performed on the batteries after 1000 cycles. The internal resistance before and after the drop test was measured to obtain internal resistance increase rate X2. However, in the drop test, a height to drop the batteries was changed from 1 m to 1.5 m.

Example 2

In the preparation of the sealing body, the gasket having two notches in the sloped portion and the flange portion was used. The other points were set to be the same as Example 1, and twenty hermetically sealed cylindrical lithium batteries having the structure illustrated in FIG. 3 were prepared. The batteries were evaluated similarly to Example 1.

Example 3

In the preparation of the sealing body, the gasket having three notches in the sloped portion and the flange portion was used. The other points were set to be the same as Example 1, and twenty hermetically sealed cylindrical lithium batteries having the structure illustrated in FIG. 4 were prepared. The batteries were evaluated similarly to Example 1.

Example 4

In the preparation of the sealing body, the gasket having two notches in the sloped portion and the flange portion was used.

In addition, two through-holes (diameter: 1.5 mm) were formed in the flange portion of the gasket at positions forming angles of ±90° in the circumferential direction with respect to the notches.

The other points were the same as Example 1, and twenty hermetically sealed cylindrical lithium batteries having the structure illustrated in FIG. 3 and the through-holes in the second portion of the gasket were prepared. The batteries were evaluated similarly.

Comparative Example 1

In the preparation of the sealing body, the gasket provided with a plate part extending from the sealing part sealing between the external terminal and the sealing plate was used. However, the plate part was extended in parallel with the normal direction (θ=0°) of the sealing plate, and the flange portion extending outward in the radial direction was not provided. An extending length of the plate part was a height such that a tip of the plate part contacts the electrode body when the sealing body is overlaid on the opening of the battery can. The plate part was not notched.

The other points were set to be the same as Example 1, and twenty hermetically sealed cylindrical lithium batteries were prepared. The batteries were evaluated similarly to Example 1.

Table 1 and Table 2 show evaluation results of the batteries of Examples 1 to 4 and Comparative Example 1 with respect to the internal resistance increase rate due to the drop test. Table 1 shows the evaluation results after the drop test performed on initial batteries immediately after preparation. Table 2 shows the evaluation results after the drop test performed on the batteries after applying 1000 cycles of thermal impact.

As shown in Table 1, with respect to the results after the drop test performed on the batteries immediately after preparation, internal resistance increase rate X1 was equal to or larger than 10% in all ten batteries of Comparative Example 1. Out of which, internal resistance increase rate X1 was equal to or larger than 20% in five batteries. On the other hand, internal resistance increase rate X1 of all ten batteries of Examples 1 to 4 was smaller than 10%. The increase of internal resistance was suppressed even when the drop impact was applied.

A reason for increased internal resistance due to drop impact is a decreased facing area between the positive electrode and the negative electrode caused by winding deviation of the electrode body due to an impact applied in the axial direction (Z-direction) of the battery. In addition, lateral deviation of the internal lead due to an impact applied in the radial direction (XY directions) of the battery has reduced the welding area with the internal lead or has broken the connection. In the batteries of Comparative Example 1, the winding deviation of the electrode body was suppressed but the lateral deviation of the internal lead was not suppressed. It is assumed that internal resistance increase rate X1 has significantly increased, compared with Examples 1 to 4, due to this reason.

On the other hand, as shown in Table 2, the drop test was performed on the batteries after applying the thermal impact. As a result, in Examples 1 to 3, internal resistance increase rate X2 was equal to or larger than 10% and equal to or smaller than 20% in one out of ten batteries. An assumed reason is that the flange portion of the gasket has warped due to degradation of resin of the gasket by the thermal impact, and the effect of fixing in the XY directions and the Z-direction has decreased.

The through-hole formed in the flange portion of the gasket in Example 4 suppresses internal resistance increase rate X2 to a value less than 10% in all ten batteries even after applying the thermal impact.

TABLE 1

| | Internal resistance increase rate X1 | | |
|---|---|---|---|
| | Less than 10% | Equal to or larger than 10% and equal to or less than 20% | Equal to or larger than 20% |
| Example 1 | 10 | 0 | 0 |
| Example 2 | 10 | 0 | 0 |
| Example 3 | 10 | 0 | 0 |
| Example 4 | 10 | 0 | 0 |
| Comparative Example 1 | 0 | 5 | 5 |

TABLE 2

| | Internal resistance increase rate X2 | | |
|---|---|---|---|
| | Less than 10% | Equal to or larger than 10% and equal to or less than 20% | Equal to or larger than 20% |
| Example 1 | 9 | 1 | 0 |
| Example 2 | 9 | 1 | 0 |
| Example 3 | 9 | 1 | 0 |
| Example 4 | 10 | 0 | 0 |
| Comparative Example 1 | 0 | 2 | 8 |

INDUSTRIAL APPLICABILITY

A hermetically sealed battery according to the present disclosure has good impact resistance and is effectively applicable to a power source of various electronic apparatuses.

REFERENCE MARKS IN THE DRAWINGS

10, 11, 12 battery
100 battery can
200 electrode body
201 positive electrode
202 negative electrode
203 separator
210, 220 internal lead
230A upper insulating plate
230B lower insulating plate
300 sealing plate
300X first main surface
300Y second main surface
310 gasket
310A sealing part
310B sloped portion
310C flange portion
310D cut-away portion
320 washer
330 external terminal

The invention claimed is:

1. A hermetically sealed battery comprising:
   a battery can having a bottomed cylindrical shape and an opening;
   an electrode body accommodated in the battery can;
   a sealing plate covering the opening of the battery can;
   a rivet disposed on the sealing plate and serving as a terminal;
   an insulator insulates the sealing plate from the rivet; and
   an internal lead electrically connected to the rivet, wherein
   the insulator includes:
      a sealing part sealing between the sealing plate and the rivet; and
      a plate part closer to the electrode body than the sealing part, the plate part being extended in a radial direction of the electrode body,
   the plate part has a cut-away portion recessed in a periphery of the plate part in the radial direction, and
   the internal lead is partially disposed in the cut-away portion.

2. The hermetically sealed battery according to claim 1, wherein the plate part includes a sloped portion, a point on the sloped portion approaching the electrode body as the point shifting outward in the radial direction.

3. The hermetically sealed battery according to claim 2, wherein the plate part further includes a flange portion bent from the sloped portion and extended outward in the radial direction.

4. The hermetically sealed battery according to claim 3, wherein the flange portion has a through-hole provided therein.

* * * * *